BEST AVAILABLE COPY
W. GAGE.
Harvester.
No. 3,189. Reissued Nov. 10, 1868.
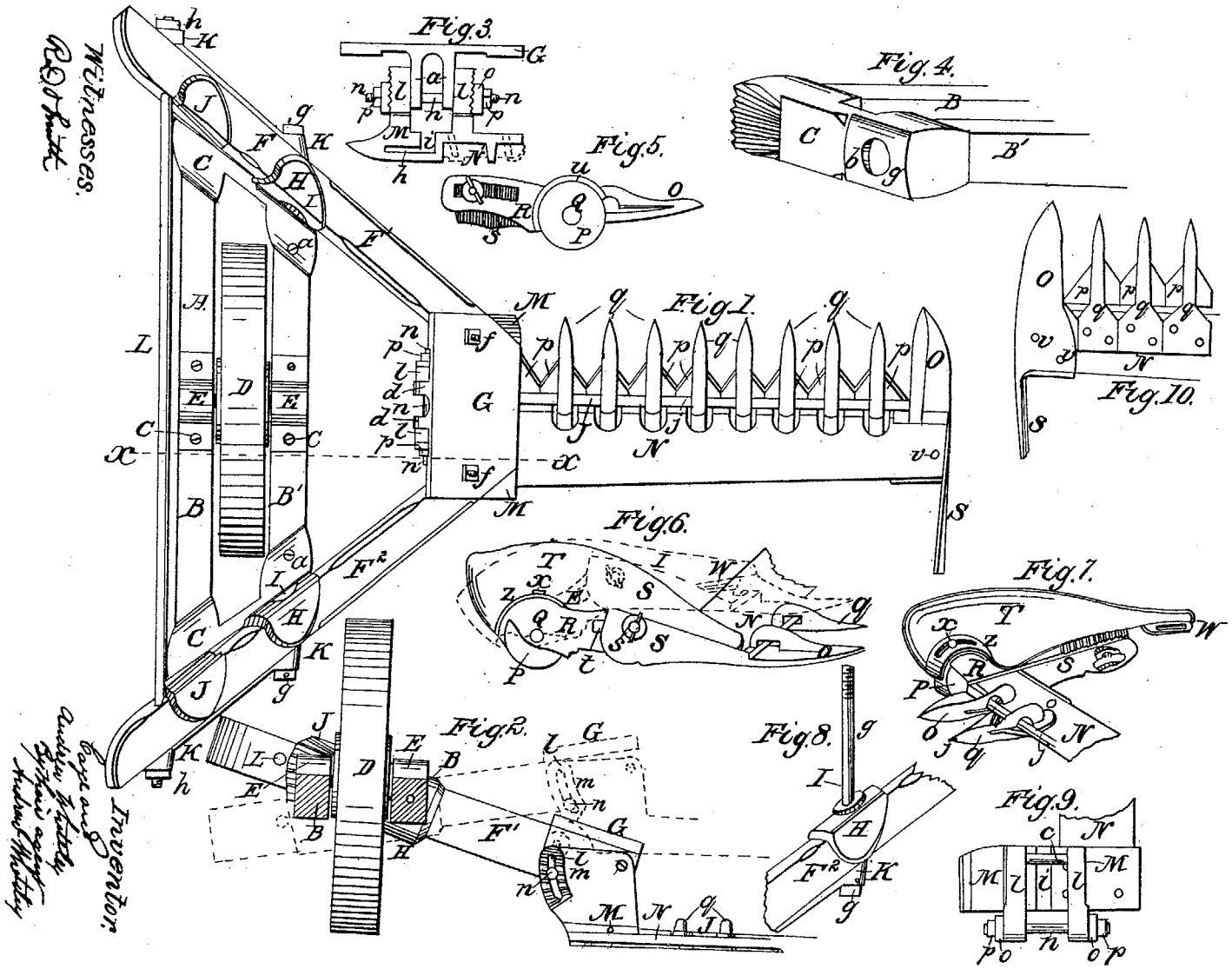
N. PETERS, Photo-Lithographer, Washington, D. C.

United States Patent Office.

WILLIAM GAGE, OF BUFFALO, NEW YORK, AND ANDREW WHITELEY, OF SPRINGFIELD, OHIO, ASSIGNEES OF WILLIAM GAGE.

*Letters Patent No.* 15,735, *dated September* 16, 1856; *reissue No.* 3,189, *dated November* 10, 1868.

DIVISION E.

IMPROVEMENT IN HARVESTERS.

The Schedule referred to in these Letters Patent and making part of the same.

*To all whom it may concern:*

Be it known that WILLIAM GAGE, of the city of Buffalo, in the county of Erie, and State of New York, did invent new and useful Improvements in Harvesters; and we do hereby declare that the following is a full, clear, and exact description of so much of said invention as is claimed in this patent, reference being had to the accompanying drawings, in which—

Figure 1 is a plan view of the machine, with the outer grain or grass-wheel and track-clearer removed, showing the cutters in their inner reciprocation.

Figure 2 is a rear elevation, on line *x–x*.

Figure 3 is a side elevation of the shoe M, and plate G, to which it is connected, and which forms part of the coupling or supplementary frame.

Figure 4 is a view of one end of the main frame.

Figure 5 is a view of the outer end of the finger-bar, showing its carrying-grain or grass wheel, and its connecting-arm reversed, and outside of the end of the finger-bar, the track-clearer being removed.

Figure 6 shows in black the outer end of the finger-bar, carrying-wheel, and track-clearer, in position for mowing, and in red the outer end of the cutting-apparatus, raised for reaping, the front end of the track-clearer raised above the finger-bar to show the slot.

Figure 7 is a perspective view of the outer end of the finger-bar, with the carrying-wheel and track-clearer reversed.

Figure 8 is a plan view of a section of the rear branch of the coupling or supplementary frame, showing the tubular pivot I and joint-bolt *g*, detached from the main frame.

Figure 9 is a top plan view of shoe M.

Figure 10 is a bottom plan of a portion of the cutting-apparatus.

That portion of this invention claimed herein will be best understood by describing the construction and operation of its parts, and their connection with each other, and then explaining wherein this differs from other inventions which preceded it, and by stating the advantages gained. We will thus describe and explain so much of the machine as is necessary to a proper understanding of the parts and combinations herein claimed.

That end of the finger-bar which is connected to the shoe, and terminates at its inner edge, as shown in fig. 2, we call its inner end, and that end to which the divider is connected, and which is next to the standing crop, we call the outer end.

That end of the coupling or supplementary frame which is nearest to the cutter's driving-wheel, and is hinged to the outer side of the main frame, we call its inner end, and that end to which the shoe M is attached we call its outer end.

The same letters designate the same parts in all the different views of the drawings.

A is the main frame of the machine, composed of two side pieces, B and B′, of wood, and two connecting castings, C and C, each having two hollow projections, into which the ends of B and B′ are inserted, as shown in fig. 1, and those encompassing the ends of B′ are confined thereto by the screw-bolts *a a*. Through each of the outer ends of these castings C C, as shown in fig. 4, is made a large hole, *b*, and in the outward projections, at the inner end of each of the castings C C, are cut serrations, radiating from the centre line of the holes *b b*.

D is the cutter's driving-wheel, which also supports the main frame. E is the axle of this wheel, and is connected to the main frame A by the boxes *c c*.

For the reason that the improvement in the shoe is the first and controlling part of that portion of the invention herein claimed, we will describe its construction before describing the construction of the coupling-frame between it and the main frame.

M is the shoe at the inner end of and forming a part of the cutting-apparatus. The finger-bar N, forming another part thereof, has no other connection with the frame of the machine, to which this shoe is connected, than the connection which is derived through the shoe. This shoe M, besides thus sustaining the finger-bar, is constructed with the guide-way *i*, to guide the cutter-bar *j*, to which the several sections of the cutter are rigidly secured across it in a straight line; the horizontal slot *k*, into and out of which the innermost section of the cutter is reciprocated, in the same manner and with the same effect as when said section is reciprocated into and out of the slot of the innermost guard-finger; and the projections *l l*, through which and the branches *d d* (which are parts of said frame) the axial bolt *e* is passed, connecting this shoe and frame together by one axis of motion, which is at about right angles to the finger-bar, instead of connecting said frame and shoe by two such axes as were patented by Jacob Swartz, in 1854, so that, besides this shoe M being connected to the frame by a hinge-connection, as said Swartz had it, the outer end of the cutting-apparatus, of which it, the finger-bar N, and cutter-bar *j*, form parts, may rise and fall within the limits allowed it, with the undulations of the ground over which it is drawn, without affecting or being affected by the height of this axis or the vertical position of the cutter's driving-wheel.

We are aware that the use of a harvester's shoe, which contained all these features just named in shoe M, except that of its connection to the frame of the machine being made by one axis of motion, which was about at right angles to the finger-bar, so that the outer end of the cutting-apparatus could be vibrated within the limits allowed it upon this axis, was well understood previous to this invention; but we are not aware that the harvester's shoe ever existed previous to this invention which contained all the features named in the preceding paragraph as contained in shoe M, including the projections *l l*, and their one axis of motion therein described, to whatever part of the machine this shoe was connected; and therefore we do not wish to be understood as limiting our first claim, that upon the combination of features contained in the shoe M, to there being an intermediate part between it and the main frame, so that it can be raised or lowered, in respect to the main frame, and, when thus moved, have the longitudinal distance between it and the plane of the cutter's driving-wheel varied, as it will be obvious that the freedom of the outer end of this cutting-apparatus to be vibrated upon this one axis of motion *e*, or its equivalent, while the position of the main frame remains unchanged, will be the same, whether this shoe have an intermediate part between it and the main frame, so as to be raised or lowered in respect to the main frame, or is connected directly thereto.

This shoe M, in addition to the features above enumerated, the combination of which constitutes its novelty as a part of the harvester's cutting-apparatus, has the front end curved forward and upward, so as to pass over the cut crop without dragging it forward, and a transverse recess, N′, in which the inner end of the finger-bar N is confined by bolts.

F is the coupling or supplementary frame, through which the shoe M, at the inner end of the cutting-apparatus, receives its connection with the main frame of the machine, so that this shoe can be raised or lowered in respect to the main frame, while said frame remains in the same position, and, when thus moved, have its horizontal distance, from the plane of the cutter's driving-wheel D, varied, as the outer end of the cutter's driving-pitman is, when the position of the shoe is thus varied in being raised or lowered, that the cutters and fingers may maintain substantially the same position in respect to each other, whatever the height of this shoe in respect to the axis of the cutter's driving-wheel D.

We do not wish to be understood as claiming that WILLIAM GAGE was the first to conceive the idea of connecting the harvester's cutting-apparatus to the main frame of the machine in such a manner that the inner end could be raised and lowered in respect to the main frame, while said frame remained in the same position, and, when thus moved, have its longitudinal distance from the plane of the cutter's driving-wheel varied, as the outer end of the cutter's driving-pitman would be, as we are aware that he was not the first to conceive the idea of doing this; but we are not aware that the harvester's shoe, having in combination all the features herein described in the shoe M, as its novelty, was ever connected to the main frame of the machine in such a manner as to be raised and lowered in respect to said main frame, when said frame remained in the same position, and, when thus moved, have its longitudinal distance from the plane of the cutter's driving-wheel varied with that of the outer end of the cutter's driving-pitman, and therefore we do not wish to be understood as limiting our second claim, that upon the combination of this shoe M with the coupling-frame F, to this frame having any of the peculiarities of construction contained therein, by which other advantages, which are independent of the kind of cutting-apparatus combined therewith, are obtained, but to the shoe M, having therein the combination of features described as constituting its novelty, and connected to the main frame of the machine by the coupling-frame F, or an equivalent thereof, by which it can be raised or lowered, in respect to the main frame, and, when thus moved, have its longitudinal distance from the plane of the cutter's driving-wheel varied.

The coupling-wheel F is composed of the front branch, $F^1$, and the rear branch, $F^2$, of wood, and the cast-metal plate G, connected together by the screw-bolts *f f*.

The inner end of this frame F is connected to the main frame by the joint-bolts *g g*, that form the centre line of the axis *g*, about parallel with the plane of the cutter's driving-wheel, as shown in fig. 1, and the shoe M, at the inner end of the cutting-apparatus, is connected to the outer end of the coupling-frame, through the branches *d d* of the plate G, by the axial bolt *e*, as shown in fig. 2, also about parallel with the axis *g*.

By this construction of the coupling-frame F, the inner end connected to the main frame, and the outer end connected to the inner end of the cutting-apparatus, many distinct features of novelty are obtained.

The first of these features claimed in this patent is the connection of this coupling-frame F, irrespective of its form, to the main frame, by the axis *g*, and the connection of the inner end of the cutting-apparatus, irrespective of its parts, to the outer end of the coupling-frame, by the axis *e*, without any other axes of motion than those between the cutting-apparatus and main frame, so that the axis *e* can be raised or lowered in respect to the main frame, while this frame remains in the same position, and the outer end of the cutting-apparatus remains at the same height, and so that this axis *e* will remain at substantially the same distance from, and in the same position in respect to the axis *g*, when thus raised or lowered. Besides, the outer end of the cutting-apparatus being free to rise or fall within the limits allowed it by the slot *m* and plate G, with the undulations of the ground, vibrating upon this axis *e*, without affecting or being affected by its height or the vertical position of the driving-wheel.

The second of said features in this coupling-frame F herein claimed, is its skeleton-form, whereby the requisite strength to resist lateral strain is obtained with less weight than could otherwise be, and thus the machine is caused to run lighter than it would if this skeleton coupling-frame were not used.

The third of said features in this coupling-frame F, herein claimed, is its construction in separate parts, so that a broken or worn-out portion can be replaced by another without replacing the whole.

*q q q q q q q q* are the guard-fingers, and O is the divider. Each has a horizontal slot, which is in line with that in the shoe M, when secured to the finger-bar N, which is sustained and drawn forward by said shoe.

*r r r r r r r r r* are the several sections or cutters of which the cutter is formed, rigidly secured to the cutter-bar *j*, each being the same in length thereon as the distance between the centre of the fingers, and reciprocated across the shoe, fingers, and divider, and through their slots in straight lines.

The intermediate gearing, and the crank and pitman between the cutter-bar *j* and the cutter's driving-wheel D are not shown, as they may be of any of the kinds generally in use.

What we claim in this patent as the invention of WILLIAM GAGE, is—

1. The shoe M, or an equivalent thereof, which, when disconnected from the frame of the harvester, to which it is connected, leaves the finger-bar of the cutting-apparatus entirely disconnected from said frame, and which shoe has, in combination, the guide-way *i*, the horizontal slot *k*, and the projections *l l*, fitted to receive the axial bolt *e*, or equivalents of these parts, for the purposes specified.

2. The combination of the shoe M, or an equivalent thereof, constructed with the guide-way *i*, the horizontal slot *k*, and the projections *l l*, with the coupling-frame F, or an equivalent thereof, which enables this shoe to be moved, in respect to the main frame and the plane of the cutter's driving-wheel, substantially as first herein described for the purposes specified.

3. In combination with the main frame of the harvester and the shoe M, or an equivalent thereof, which is constructed with the guide-way *i*, the horizontal slot *k*, and the projections *l l*, the coupling-frame F, or an equivalent thereof, which has its inner end connected to said frame by the axis *g*, or an equivalent thereof, and its outer end connected to the shoe by the axis *e*, or an equivalent thereof, and having no other axis than these two between the main frame and shoe, for the purposes specified.

4. In combination with the main frame of the harvester, and with the shoe M, or an equivalent thereof, which is constructed with the guide-way *i*, the horizontal slot *k*, and the projections *l l*, fitted to receive the axial bolt *e*, or equivalent of these parts, the skeleton coupling-frame F, or an equivalent thereof, which has its inner end connected to the main frame by the axis *g*, or an equivalent thereof, and its outer end connected to the shoe by the axis *e*, or an equivalent thereof, and having no other axis than these two between the main frame and this shoe, for the purposes specified.

5. In combination with the main frame of the harvester, and with the shoe M, or an equivalent thereof, which is constructed with the guide-way *i*, the horizontal slot *k*, and the projections *l l*, fitted to receive the axial bolt *e*, or equivalents of these parts, the skeleton coupling-frame F, or an equivalent thereof, made of separate parts, for the purposes specified.

In witness whereof, I have hereunto subscribed my name and set my seal, in presence of—

WILLIAM GAGE. [L. S.]

Witnesses:
BENJ. H. AUSTIN, Jr.,
BENJ. H. AUSTIN.

In witness whereof, I have hereunto subscribed my name and set my seal, in presence of—

ANDREW WHITELEY. [L. S.]

Witnesses:
EDM. F. BROWN,
R. D. O. SMITH.